United States Patent Office 3,043,756
Patented July 10, 1962

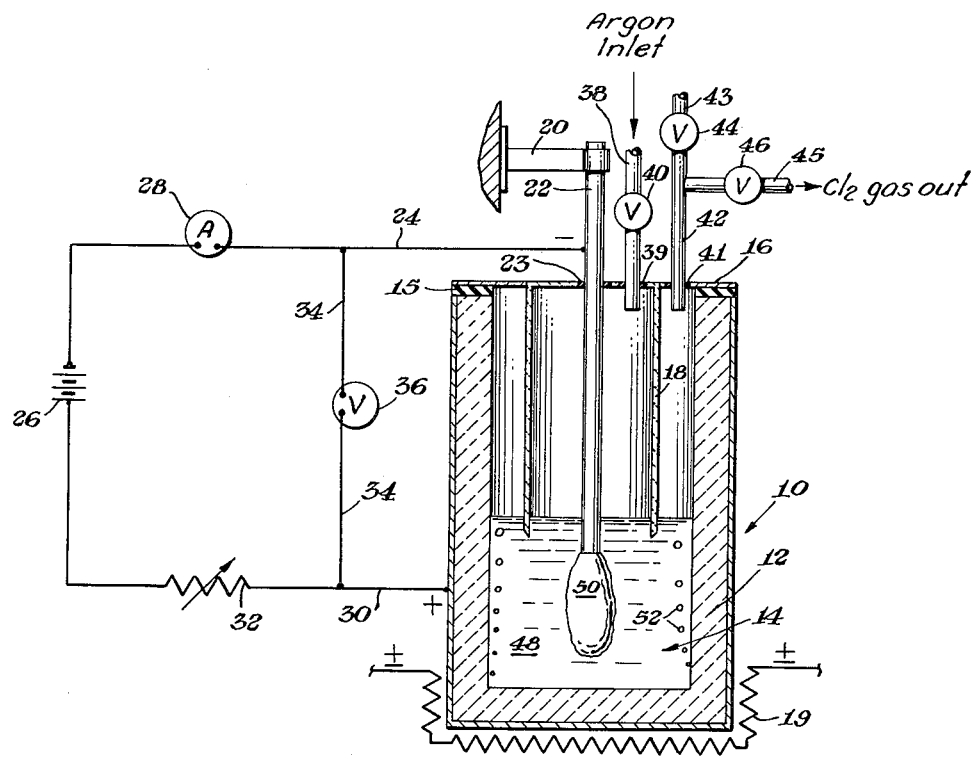

3,043,756
CALCIUM METAL PRODUCTION
George B. Cobel and Paul R. Juckniess, Midland, Mich., assignors to The Dow Chemical Company, Midland, Mich., a corporation of Delaware
Filed July 31, 1958, Ser. No. 752,350
5 Claims. (Cl. 204—69)

The invention relates to the production of calcium metal by the electrolysis of a molten salt mixture.

Calcium metal is not produced in high tonnage quantities on the order of such metals as iron, copper, nickel, lead, magnesium, or aluminum. It is, however, of great importance industrially because of a number of special uses for which it is particularly suitable. Among such uses are: an alloying agent for such metals as aluminum, lead, copper, and magnesium; a reducing agent in the preparation of chromium, thorium, uranium, titanium and zirconium metals; a separator for argon and nitrogen; a deoxidizer for copper, iron, nickel-chromium alloys, nickel bronze and tin bronze; a desulfurizing agent for both metals and petroleum fractions; a dehydrating agent for alcohol and organic solvents; a starting material in the manufacture of calcium hydride; and a reagent in the preparation of special alloys such as the high lead chromium-nickel bearing bronzes and nickel castings.

Known methods of producing calcium include alloying sodium metal with lead and then reacting the alloy thus formed with molten calcium chloride whereby the calcium displaces the sodium and forms calcium-lead alloy together with sodium chloride and subsequently separating the calcium from the lead; by the reduction of calcium compounds by the use of silicon, titanium, aluminum, and beryllium; and by the electrolysis of molten calcium chloride or a mixture of calcium chloride and calcium fluoride in a weight ratio of about 6:1, respectively, at a temperature above the melting point of calcium and recovering calcium metal, which rises to the top of the electrolyte in a molten layer, by means of a retractable cathode upon which the calcium collects in a carrot-shaped deposit.

Of the known methods of producing calcium, electrolysis of molten calcium chloride or a mixture of calcium chloride and calcium fluoride have been used most extensively. Serious disadvantages, however, are associated with the use of either of these electrolytes.

Among the principal disadvantages of electrolyzing calcium chloride is the high melting point of the electrolyte, it being about 780° to 800° C. A further disadvantage is that the calcium metal at this temperature is soluble to the extent of about 17 percent of the weight of the calcium chloride electrolyte. A third disadvantage is that, at this temperature, the calcium metal formed creates a finely divided fog which burns readily.

A mixed bath of calcium chloride and calcium fluoride usually consists of 100 parts calcium chloride and about 16.5 parts by weight of calcium fluoride. The electrolysis temperature must be above the melting point of the calcium metal being produced. The melting point of pure calcium metal has been given as 851° C. by Antrapoff and Falk, Z. Anorg. Allegem. Chem. 12 p. 415 (1930). Although the use of the calcium chloride and calcium fluoride bath offers some advantage over the pure calcium chloride bath in reduced solubility of the calcium metal produced therein and having a slightly lower melting point, the calcium metal must still be recovered by means of a contacting retractable cathode and is beset with a number of problems associated therewith among which are the difficulty of preventing the simultaneous produced chlorine gas from contaminating the calcium metal coming in contact therewith. The necessity also of protecting the calcium metal from the action of the air makes employment of the retractable cathode difficult.

Electrolysis employing known electrolytes for the production of calcium metal requires high voltages, at least 25 volts usually being employed. The power efficiency is low, 20 kilowatts of power usually being required to produce 1 pound of calcium. The high temperatures and voltages required result in greater maintenance costs and shorter cell life.

There is, accordingly, a need for an improved method of producing calcium metal electrolytically which obviates the use of a high melting bath and of the recovery of the calcium metal from a molten layer on the top of the electrolyte by means of a retractable cathode.

The principal object of the invention is, therefore, to provide an improved electrolyte for the production of calcium and an improved method employing such electrolyte. A description of the electrolyte and a method of its use to attain the objects of the invention appear hereinafter and are particularly pointed out in the claims.

The invention provides for the use of a more-or-less fixed cathode submerged below the surface of an electrolyte having a melting point appreciably below the melting point of calcium metal whereby the calcium metal is recovered in a solid state on the cathode. The employment of the electrolyte of the invention results in the production of calcium metal and chlorine gas at a lower voltage, a lower power consumption, and in a more convenient and efficient manner than has heretofore been experienced by the use of known electrolytic methods of producing calcium metal.

The invention is a novel electrolyte consisting of a mixture of calcium chloride and barium chloride with or without minor percentages of potassium chloride or potassium chloride and calcium fluoride. The electrolyte is operable within the following ranges set out in Table I:

Table I

| Percent $BaCl_2$ | Percent $CaCl_2$ | Percent KCl | Percent $CaF_2$ |
|---|---|---|---|
| 60–40 | 40–60 | None | None |
| 63–37 | 37–63 | Up to 15 | None |
| 70–30 | 30–70 | Up to 15 | Up to 15 |

The operating temperature of the bath is any temperature above the melting point of the electrolyte and below the melting point of calcium metal. Preferably the temperature of the bath is usually maintained at 10° or 15° above its melting point as a margin of safety and below about 680° C., and more commonly below 650° C.

A cell of the type shown in the drawing is usually employed in the practice of the invention. It is desirable that some provision be made for the separate recovery of the chlorine gas which is shown in the drawing as merely being vented. It is also necessary that there be a means for providing the inert atmosphere over the electrolyte. The cathode containing the calcium accumulated thereon should be removable from the cell so that the calcium metal may be scraped therefrom or the cathode placed in a heat chamber and the calcium volatilized off and recovered.

The drawing is an elevational view, largely in section, of a cylindrical cell useful in practicing the invention.

Referring to the drawing in some detail there is shown cylindrical metal pot 10, and liner 12 therefor, defining chamber 14. Circular cover 16 is tightly fitted on the top of pot 10 and provides a cover for chamber 14. Electrically insulating gaskets 15 insulate cover 16 from the walls of pot 10. Secured to the undersurface of cover 16 and extending downwardly into chamber 14, as shown, is cylindrical refractory diaphragm 18. Electric element 19 provides a means for heating chamber 14. Supported by bracket assembly 20 is steel cathode 22 which passes through an opening provided therefor in cover 16. Electrically insulating gasket 23 provides a snug fit between cathode 22 and the opening in top 16. Electric lead line 24 leading from the negative terminal of D.C. source 26 through ammeter 28 is connected to cathode 22. Electric lead line 30 leading from the positive terminal of the D.C. source through adjustable resistant coil 32 is connected to the wall of pot 10 which thereby is made the anode of the cell. Electric line 34 and voltmeter 36 which is connected thereby to lead lines 24 and 30 provide a means for measuring the voltage when desired. Inlet pipe 38 having valve 40 therein provides a means for the admission of inert gas to chamber 14. Outlet pipe 42 bifurcates into pipe 43 having valve 44 therein which provides a means for releasing purged gases from chamber 14 prior to operation and into pipe 45 having valve 46 therein for egress of chlorine gas produced during the cell operation. Electrically insulating gaskets 39 and 41 provide snug fits for pipes 38 and 42, respectively, as they pass through the openings provided therefor in cover 16 into chamber 14.

The electrolyte in chamber 14 is indicated by numeral 48, accumulated calcium metal on the submerged portion of the cathode by numeral 50, and rising bubbles of chlorine gas in the electrolyte by numeral 52.

Melting points of electrolytes illustrative of the invention are set out in Table II:

*Table II*

| Percent BaCl$_2$ | Percent CaCl$_2$ | Percent KCl | Percent CaF$_2$ | M. P., °C. |
|---|---|---|---|---|
| 50 | 50 | None | None | 595 |
| 42 | 42 | 8 | 8 | 570 |
| 57 | 38 | 5 | None | 524 |
| 31 | 59 | 6 | 4 | 491 |

The practice of the invention is illustrated by the following example:

A mixture of 100 parts anhydrous calcium chloride, 100 parts barium chloride, and 20 parts potassium chloride by weight (a percentage ratio of about 42:42:16, respectively) were electrolyzed under the following conditions:

| | |
|---|---|
| Current | 20 amperes. |
| Temperature | 680°C. |
| Period of electrolysis | 30 minutes. |
| Calcium produced | 5.7 grams. |
| Current density | 9.2 amperes/sq. in. |
| Voltage | 4.2 volts. |
| Ampere hours | 10. |
| Chlorine evolved | 7.2 grams. |
| Chlorine efficiency | 54.5 percent. |
| Calcium efficiency | 76.5 percent. |

At the end of the run, cathode 22 was released from bracket assembly 20 and then removed from cover 16 of the cell by sliding the cover upwardly and off; the electrode was then cooled. The deposit was scraped off by means of a knife and weighed. The weight of the deposit, a mixture of calcium metal and electrolyte, was 50 grams. It analyzed 11.4 percent calcium, of 96.9 percent purity. The electrolyte may be separated from the calcium metal by known methods, one of which is to place the deposit in an oven provided with a means for volatilizing the calcium metal from adhering electrolyte and recovering the calcium metal, since all the ingredients of the electrolyte have a considerably higher boiling point than that of the calcium metal. The calcium metal may, however, be most effectively separated from the electrolyte by employing the method and apparatus described in copending application S.N. 758,784, filed September 3, 1958, now Patent No. 2,960,397, wherein the mixed calcium metal and electrolyte are subjected to a vertical reaction zone consisting of an upper high-temperature section and a lower low-temperature section and recovering the calcium metal as a layer at the top of the zone and leaving the electrolyte at the lower part of the zone.

An appraisal of the results obtained by the practice of the instant invention shows marked advantages over known ways of producing calcium metal. Among such advantages are: reduced bath temperatures; convenient recovery of calcium metal on a submerged cathode obviating the inconvenience of the contact method of recovering calcium metal on a retractable cathode; a longer lasting cell; lower operating voltages, such being on the order of 3.5 volts as opposed to about 25 volts employed in known methods; high power efficiency shown by the consumption of about 4 kilowatts of power per pound of calcium in contrast to about 20 kilowatts of power per pound of calcium when employing known electrolytes.

Having described the invention, what is claimed and desired to be protected by Letters Patent is:

1. The method of producing calcium metal electrolytically consisting of electrolyzing a molten salt bath consisting of between 60 and 40 percent BaCl$_2$ and between 40 and 60 percent CaCl$_2$ at a temperature above the melting point of the bath and below the melting point of calcium metal, collecting the calcium metal as a solid on a submerged cathode, and removing the thus collected calcium metal from said cathode.

2. The method of claim 1, wherein the bath consists of about 50 percent BaCl$_2$ and about 50 percent CaCl$_2$, and the electrolyzing temperature is between about 595° and 650° C.

3. The method of producing Ca metal electrolytically consisting of electrolyzing a molten salt bath consisting by weight of between 63 and 37 percent BaCl$_2$, between 37 and 63 percent CaCl$_2$, and up to 15 percent KCl, at a temperature above the melting point of the bath and below the melting point of Ca metal, collecting the Ca metal as a solid on a submerged cathode and removing the thus collected Ca metal from said cathode.

4. The method of producing Ca metal electrolytically consisting of electrolyzing a molten salt bath consisting by weight of between 70 and 30 percent BaCl$_2$, between 30 and 70 percent CaCl$_2$, and up to 15 percent KCl, and up to 15 percent CaF$_2$, at a temperature above the melting point of the bath and below the melting point of Ca metal, collecting the Ca metal as a solid on a submerged cathode, and removing the thus collected Ca metal from said cathode.

5. The method of producing Ca metal electrolytically consisting of electrolyzing a molten salt bath consisting by weight of about 42 percent BaCl$_2$, about 42 percent CaCl$_2$, and about 16 percent of the combined weight of KCl and CaF$_2$, at a temperature above the melting point of the bath and below the melting point of Ca metal, collecting the Ca metal as a solid on a submerged cathode, and removing the thus collected Ca metal from said cathode.

References Cited in the file of this patent

UNITED STATES PATENTS

| 886,857 | Price et al. | May 5, 1908 |
| 1,116,865 | Acker | Nov. 10, 1914 |

FOREIGN PATENTS

| 494,702 | Great Britain | Oct. 31, 1938 |

OTHER REFERENCES

Transactions of the Electrochemical Soc., vol. 37, p. 475.
Brace, Trans. of the American Electrochemical Soc. XXXVII (1920), page 475.
International Critical Tables, first edition, vol. 4 (1928), page 63.
Metal Industry, July 26, 1946, page 75.